United States Patent [19]

Van Wechem et al.

[11] Patent Number: 4,967,706
[45] Date of Patent: Nov. 6, 1990

[54] INTERNAL-COMBUSTION ENGINE OF THE INJECTION TYPE, AND PLATE INTENDED FOR FITTING BETWEEN THE INLET PORTS OF A CYLINDER BLOCK OF SUCH AN ENGINE AND AN INLET TUBE

[75] Inventors: Gustaaf L. Van Wechem; Arie Van Der Ploeg; Gerrit J. Beunk, all of Holland, Netherlands; Juergen Henke, Wernau, Fed. Rep. of Germany; Erwin Spinner, Wernau, Fed. Rep. of Germany; Peter Frueh, Weinstadt, Fed. Rep. of Germany

[73] Assignee: Texas Instruments Incorporated, Dallas, Tex.

[21] Appl. No.: 349,246

[22] Filed: May 9, 1989

[30] Foreign Application Priority Data

May 24, 1988 [NL] Netherlands .................. 8801334

[51] Int. Cl.$^5$ .............................................. F01L 3/00
[52] U.S. Cl. ............................... 123/188 M; 123/549
[58] Field of Search .............. 123/188 M, 590, 549

[56] References Cited

U.S. PATENT DOCUMENTS

| | | | |
|---|---|---|---|
| 3,145,699 | 8/1964 | High | 123/445 |
| 3,760,780 | 9/1973 | Jordan | 123/549 |
| 4,378,001 | 3/1983 | Takeda et al. | 123/445 |
| 4,387,291 | 6/1983 | Keppel | 123/549 |
| 4,834,053 | 5/1989 | Van Der Ploeg et al. | 123/549 |

FOREIGN PATENT DOCUMENTS

| | | |
|---|---|---|
| 0234052 | 9/1987 | European Pat. Off. . |
| 3247978 | 6/1984 | Fed. Rep. of Germany . |
| 3426469 | 5/1986 | Fed. Rep. of Germany . |

*Primary Examiner*—E. Rollins Cross
*Attorney, Agent, or Firm*—James P. McAndrews; John A. Haug; Melvin Sharp

[57] ABSTRACT

An internal-combustion engine of the injection type comprises a cylinder (1) which is provided with an inlet channel (4) with inlet valve (5). An inlet tube (2) with fuel injector (3) is fixed on this inlet channel. A heating element with a heat sink (11, 12), electrical resistance means (16) and current supply means (14, 17, 18, 20) projects into the inlet channel of the cylinder. In order to avoid cold spot problems, the heating element (11 to 16) is not fitted in a thermally insulated manner, and is integrated in a plate (6) which is clamped between the inlet tube (2) and the head of the cylinder (1). The electrical resistance means (16) are provided in a chamber (11) whose top face forms part of the heat sink. A cylindrically curved wall (12) preferably connects to the chamber (11) and is connected to this plate by means of material bridges (10).

12 Claims, 3 Drawing Sheets

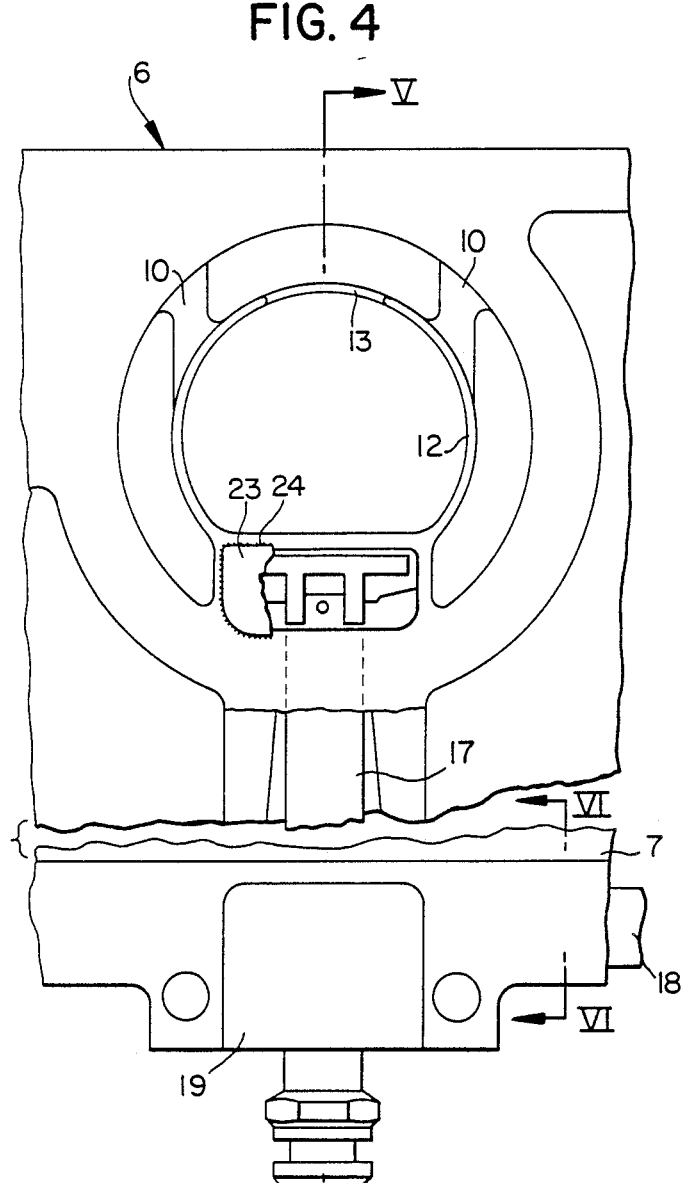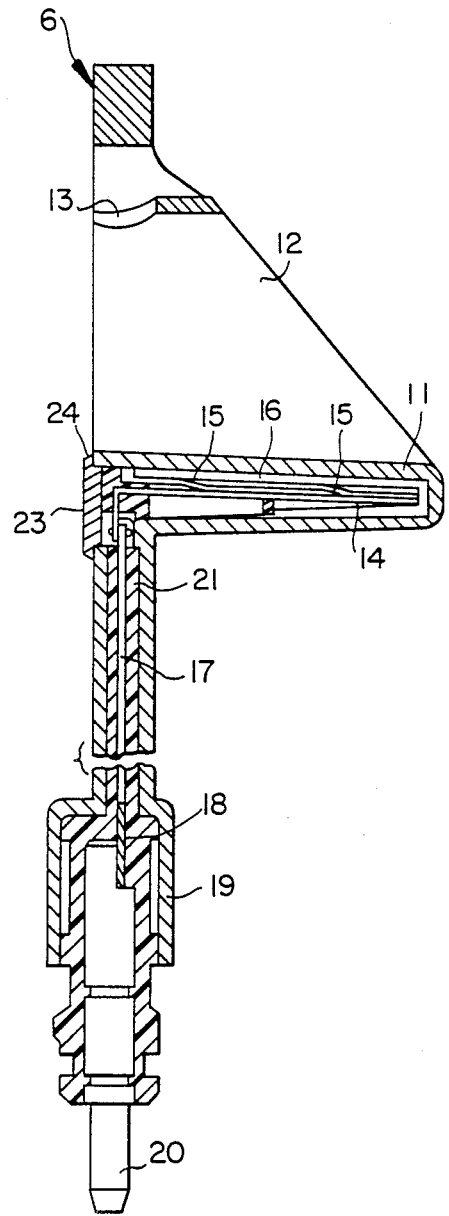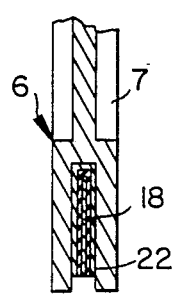

INTERNAL-COMBUSTION ENGINE OF THE INJECTION TYPE, AND PLATE INTENDED FOR FITTING BETWEEN THE INLET PORTS OF A CYLINDER BLOCK OF SUCH AN ENGINE AND AN INLET TUBE

In the first instance the invention relates to an internal-combustion engine of the injection type, comprising at least one cylinder which is provided with an inlet channel with inlet valve, on which inlet channel an inlet tube with fuel injector is fixed, while a heating element projects into the inlet channel of said cylinder, said heating element having a heat sink, electrical resistance means disposed thereon, and current supply means.

Such an internal-combustion engine is known from German Patent Specification No. 3426469.

It was found that about 50% of the total exhaust gas emission, measured in an official emission test cycle (for example, ECE 15 or FTP test), was formed in the short period during which the engine had not yet reached its operating temperature. Even exhaust gas catalytic converters, which in normal circumstances reduce the exhaust gas emission by about 90%, do not achieve this degree of conversion until the operating temperature of the catalytic converter is reached. The conversion starts at a temperature of about 30020 C., so that after a cold start the exhaust gas emission from the engine is reduced little, if at all. Since petrol consists of a mixture of hydrocarbons with a boiling range of about 30° to about 200° C. and with a cold engine the temperature level is not high enough to vaporize the fuel, an additional quantity of fuel must be fed in when the engine is cold, in order to obtain a combustible mixture. This leads to a high exhaust gas emission. At a low engine temperature both petrol consumption and the exhaust gas emission are therefore relatively high.

By heating of petrol a considerable contribution is therefore made to the improvement of the environment, and an appreciable fuel saving is also achieved, although little or no additional fuel is injected.

In the internal-combustion engine mentioned in the preamble the petrol is sprayed on the heating element heated in a short time to the desired temperature, and is thereby heated to the desired temperature. The petrol will consequently vaporize better, and a better mix with the combustion air is also achieved. The heating element is switched off when the engine is warm enough to take over the vaporization of the petrol.

In the engine known from the above-mentioned German Patent Specification the heating element is designed in the form of a pipe enclosed by an insulation tube. Both the pipe and the tube are provided with a flange, and these flanges lie in a recess of the cylinder head and are fixed by the inlet tube. A problem with the above-mentioned insulation tube is that the heating element is thermally insulated relative to the engine block and that when the engine is hot and the heating element is thus switched off, the insulation tube receives no heat from the engine block. The fuel atomized on the insulation tube, however, condenses on this tube. Particularly when the ambient temperature is low, this causes cold spot problems which result in reduced running performance of the engine. Another problem with the fixing of the pipe and the tube described above is that an additional recess has to be provided in the cylinder for said flanges.

The object of the invention is to avoid these problems and produce an internal-combustion engine of the type indicated in the preamble, the heating element of which has a thermally conducting connection with the cylinder head, and for the fixing of which no additional provisions need be made in the cylinder head.

According to the invention, the internal-combustion engine is to this end characterized in that the heating element is not fitted in a thermally insulated manner, and is integrated in a plate which is clamped between said inlet nozzle and the head of said cylinder, and electrical resistance means are provided in a chamber whose top face forms part of the heat sink. This chamber is of optimum design as regards the medium to be heated and is closed off at the rear side towards the inlet nozzle.

Said plate is made from a good heat-conducting material, for example an aluminum alloy. The seal between this plate and the cylinder head is a good heat-conducting gasket, for example an aluminum alloy. The seal between the plate and the inlet tube is, on the other hand, made of an insulating material, for example paper. There is thus an excellent heat-conducting connection between the cylinder head and the heating element. Due to the fact that the relatively fragile contacts are fitted in an enclosed chamber, they remain clean and in this way ensure a reliable electrical contact. If the electrical resistance means were to become detached from the heat sink, they could not fall into the engine. If PTC material is used as the resistance material, the chosen design means that aging of the PTC tablet is minimized.

The injected fuel comes into good contact with the heating element because it is directed by the injector towards the heat sink, where the PTC tablet is fitted on the spot, and also because through atomization of the fuel contact takes place with a cylindrically curved wall which is connected by means of material bridges to the PTC chamber. The heat flow from and to the cylinder head can be influenced by altering the dimensions of these material bridges. All this is selected in such a way that the most heat, the highest temperature level and the best heat transfer are achieved on the face where the atomized fuel flow comes into contact with the heat sink.

Through using a single plate for all cylinders in an internal-combustion engine with several cylinders, the desired fuel heating for the entire engine can be achieved with a single element.

The external current supply to the heating elements is very simple if the PTC tablets of all heating elements are connected to a single connector pin by means of insulated current conductors embedded in the plate.

The invention also relates to a plate intended for fitting between the inlet ports of a cylinder block of a direct injection engine and an inlet tube. This plate according to the invention has a number of projecting heating elements which are connected to the plate, each heating element having a chamber projecting relative to the plate surface and containing electrical resistance means, in particular one or more PTC tablets.

The invention will now be explained in greater detail with reference to the FIGURES, which show an example of an embodiment.

FIG. 4 shows a part of the top view shown in FIG. 2, on a larger scale, and with a current supply connector pin (part of the cover of a chamber is imagined cut away).

FIG. 5 shows a cross section along the line V—V in FIG. 4.

FIG. 6 shows a cross section along the line VI—VI in FIG. 4.

Figure 1:
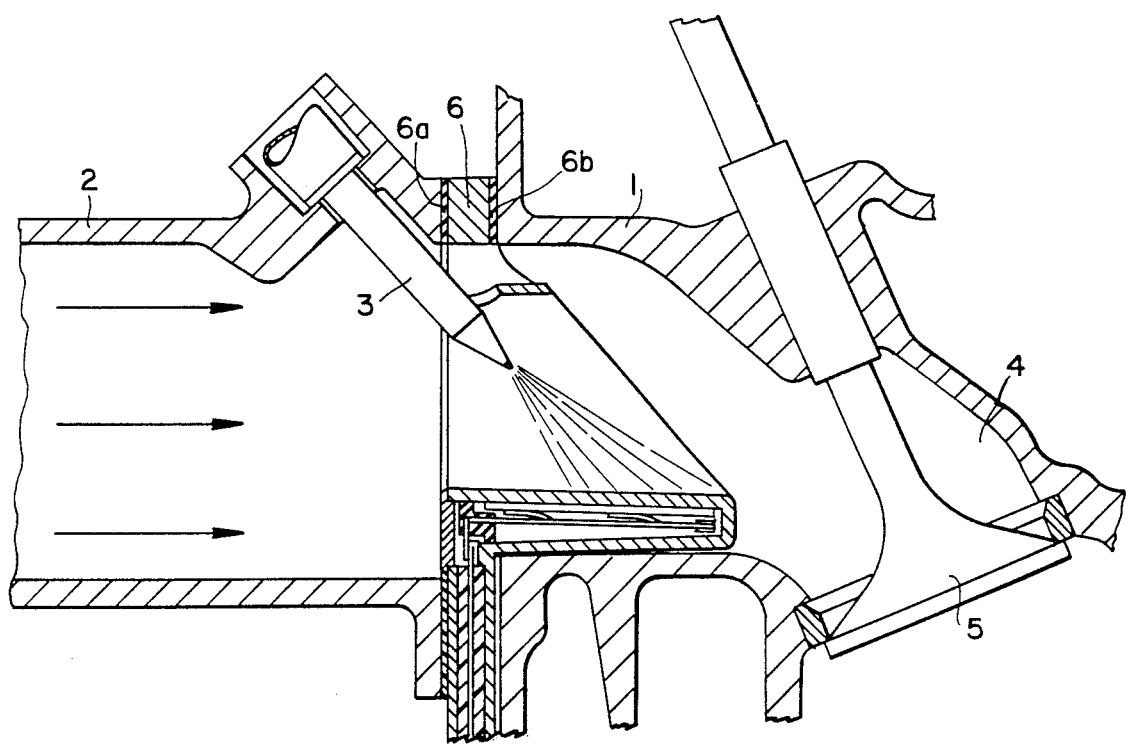
FIG. 1 shows a schematic cross section of the top part of a cylinder of a direct injection internal-combustion engine according to the invention.
Figure 2:
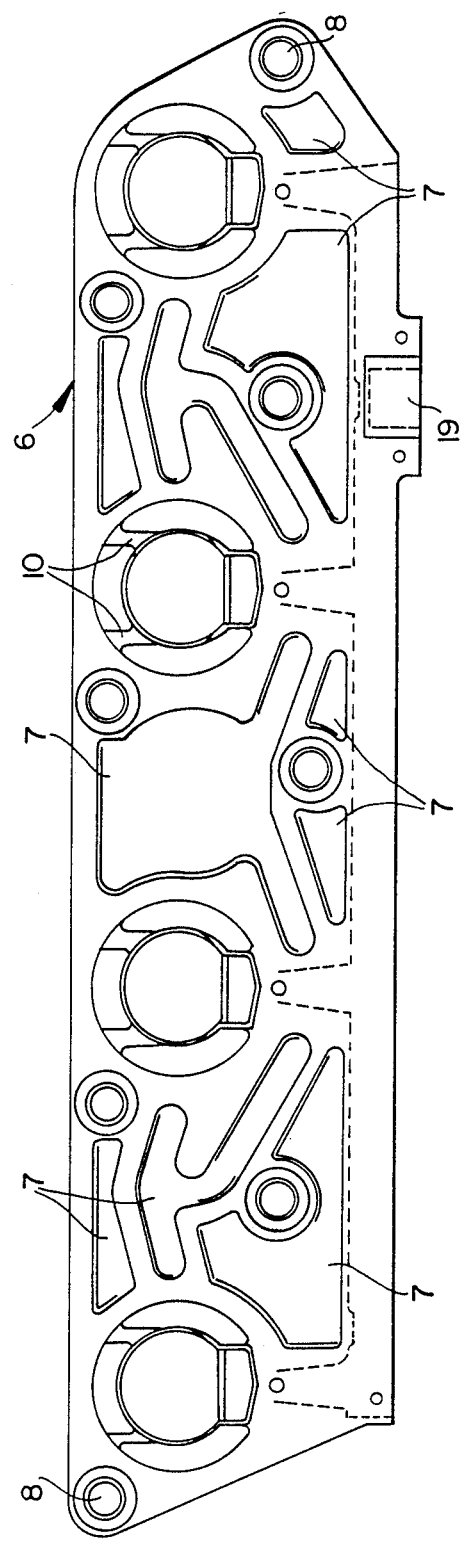
FIG. 2 shows a top view of the plate used.
Figure 3:
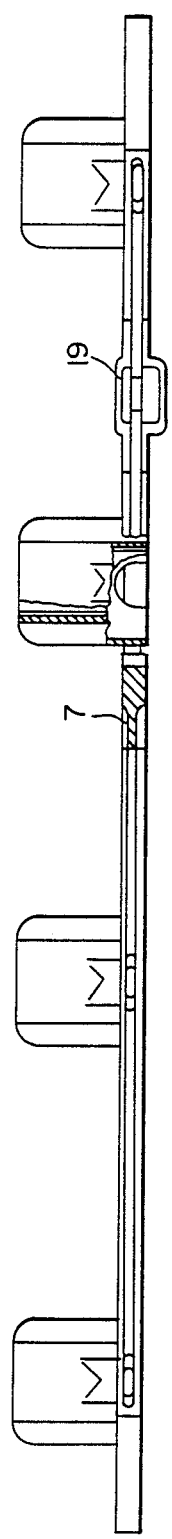
FIG. 3 shows a front view of said plate.

The top part of an internal-combustion engine shown in FIG. 1 has a cylinder head 1, on which an inlet tube 2 with fuel injector 3 is fixed. Inlet tube 2 opens out into an inlet channel 4 of the cylinder head. The inlet valve 5 is located in that channel.

A plate 6 of heat-conducting material, for example an aluminum alloy, is clamped between the inlet tube 2 and the cylinder head 1. In the case shown in the drawing this plate is common to four cylinders.

In order to pronounce the sealing faces and save material, recesses 7 are disposed in the plate and fixing holes 8 are also cut out in the plate.

At each inlet channel 4 the plate is provided with an aperture, and into each of said apertures projects a chamber 11, which is at right angles to the surface of the gasket, and a cylindrical surface 12 the width of which is at its maximum at the connection to the chamber 11 and at its minimum diagonally opposite. The cylindrical surface part of the lowest width is provided with a recess 13, through which the fuel injector projects. The top face of the chamber 11 and the cylindrical surface 12 form a heat sink.

A PTC tablet 16 is provided in each chamber 11, being fixed to the upper wall of the chamber 11 by means of a heat and electricity conducting epoxy resin. Each chamber also contains a contact spring 15 which is insulated from the heat sink by means of plastic.

Each contact spring 15 is connected, by means of a guide strip 14, a guide strip 17 connected thereto by laser welding and a guide strip 18 integral therewith, to a connector pin 20 which projects into a junction box 19. The strips 17 and 18 are disposed in an insulating encasement 21 and 22 respectively. These encasements are embedded in internal cavities of the packing material. The strip 18 is soldered to the pin 20.

The chambers 11 are closed by a cover 23 fixed by laser welds 24. The combination of plate 6 and fuel elements connected thereto by conducting material bridges is placed between inlet tube 2 and inlet port of the cylinder head, a gasket 6b of heat-conducting material such as an aluminum alloy being added at the cylinder head side, and a gasket 6a of insulating material such as paper being added at the inlet tube side. When the engine is cold, effective heating of the injected fuel is achieved. This fuel is sprayed at various angles onto the top face of the chambers 11 belonging to the heat sinks. When current is supplied via the pin 20, the current conductors 18, 17 and 14 and the contact springs 15, the tablets will be heated to a temperature value determined by the PTC material, and this heat will be passed on to the top face of the chambers 11. A rivet joint is indicated by 25.

Air is drawn into the inlet tube 2 in the direction of the arrows (FIG. 1). A streamlining element can be fitted on the cover 23 of each chamber. Apart from such a cover, the PTC tablet in each chamber can also be shut off from the environment in a different way, for example by filling powder or epoxy resin. The interior of each chamber 11 is in connection with the atmosphere via the slit-type space in which the current conductors 17 and 18 are placed. This benefits the service life of the PTC tablets.

Various modifications of the device described are possible within the scope of the invention. What is important for the inventive idea is that the heating elements are not fitted in a thermally insulated manner, and are integrated in a plate which is clamped between the inlet nozzle and the cylinder head, each PTC tablet being disposed in a closed chamber whose top face forms part of the heat sink. It is not out of the question for a different electrical resistance material to be used instead of PTC tablets.

We claim:

1. Internal-combustion engine of the injection type comprising at least one cylinder head means (1) provided with a inlet channel (4) and an inlet valve (5), on which inlet channel in inlet tube means (2) with a fuel injector (3) is fixed, and having a heating element which projectings into the inlet channel of the cylinder head means, said heating element having a heat sink (11, 12), electrical resistance means (16) disposed thereon, and current supply means (14, 17, 18, 20), characterized in that the heating element (11 to 16) is provided in a thermally uninsulated manner and is integrated in a thermally conducting plate (6) having a plate portion clamped between said inlet tube (2) and the cylinder head means (1) to be in thermally conducting relation to the cylinder head means and having a portion projecting into the inlet channels to form a chamber mounting the electrical resistance means therein, the electrical resistance means (16) being disposed in the chamber against a part of the chamber whose top face forms a part of the heat sink and extends in close heat-transfer relation from said clamped plate portion to receive fuel from the fuel injector thereon.

2. Internal-combustion engine according to claim 1, characterized in that the heat sink comprises a cylindrically curved wall (12) which is integrally connected at one side thereof to said top face of the heat sink and which is further connected by means of material bridges (10) to said plate.

3. Internal-combustion engine according to claim 1 having a plurality of cylinders, characterized in that a single plate (6) common to all cylinders has portions of the plate clamped between such inlet tube and cylinder head means for the respective cylinders, and has a plurality of plate portions projecting into inlet channels for the respective cylinders to form said respective chambers mounting respective electrical resistance means therein.

4. Internal-combustion engine according to claim 3, characterized in that the electrical resistance means in all of said chambers are connected to a single connector pin (20) via insulated current conductors (17, 18) embedded in the plate.

5. Internal-combustion engine according to claim 4, characterized in that the electrical resistance means are made up of tablets of PTC material, the chambers housing the electrical resistance means are closed at their ends, and the chambers are vented to the atmosphere.

6. An internal combustion engine according to claim 3 having packing means disposed between the clamped plate portion, the cylinder head means, and inlet tube means, the packing means between the plate and cylinder head means being selected to be heat-conducting for providing thermal linking between the plate and cylinder head means.

7. An internal combustion engine according to claim 6 wherein the packing between the plate and inlet tube means is of thermally insulating material.

8. An internal combustion engine according to claim 7 wherein the packing between the plate and cylinder head means is formed of aluminum and the packing between the plate and inlet tube means is formed of paper.

9. A plate (6) of thermally conducting material having a portion to be clamped between cylinder head means (1) of an internal-combustion engine of the injection type and inlet tube means (2) having a plurality of fuel injector means (3) fixed thereon to mount the plate in thermally uninsulated manner in heat-transfer relation to the cylinder head means, the plate having a plurality of heat sink portions (11, 12) projecting therefrom to extend into respective cylinder inlet channels (4) in the cylinder head for a plurality of engine cylinders to form respective chambers mounting respective electrical resistance means (16) therein, the electrical resistance means being disposed in each of the respective chambers against a part of the chamber whose top face forms a part of the heat sink and extends in close heat-transfer relation from said clamped part of the plate (6) to receive fuel thereon from said respective fuel injector means.

10. Plate means according to claim 9, characterized in that each heat sink comprises a cylindrically curved wall (12) which is integrally connected to said top face of the heat sink and is further connected to the plate by means of material bridges (10).

11. Plate according to claim 10, characterized in that the electrical resistance means are made up of PTC tablets said chambers are closed at their ends, and the chambers are vented to the atmosphere.

12. Plate according to claim 11 characterized in that the electrical resistance means (16) are connected to a single connector pin (20) by means of contact springs (15) and current conductors (17, 18) embedded in the plate.

* * * * *

UNITED STATES PATENT AND TRADEMARK OFFICE
CERTIFICATE OF CORRECTION

PATENT NO. : 4,967,706
DATED : November 6, 1990
INVENTOR(S) : G. Wechem, et al.

It is certified that error appears in the above-identified patent and that said Letters Patent is hereby corrected as shown below:

On the title page: Item (73) Assignee should read --
Texas Instruments Holland B.V. Almelo Holland and
Daimler-Benz AG, Federal Republic of Germany--.

Signed and Sealed this

Twenty-eighth Day of April, 1992

Attest:

HARRY F. MANBECK, JR.

*Attesting Officer*      *Commissioner of Patents and Trademarks*